(12) United States Patent
Dupuis et al.

(10) Patent No.: US 9,887,468 B2
(45) Date of Patent: *Feb. 6, 2018

(54) SPIN-WELDED ELECTRICAL GROUND ASSEMBLIES

(71) Applicant: Ford Global Technologies, LLC, Dearborn, MI (US)

(72) Inventors: Lawrence J. Dupuis, Grosse Ile, MI (US); Michael William Danyo, Trenton, MI (US); Kimberly Ann Lazarz, Ypsilanti, MI (US); Steven Rewalt, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,656

(22) Filed: Jan. 31, 2017

(65) Prior Publication Data

US 2017/0141484 A1    May 18, 2017

Related U.S. Application Data

(62) Division of application No. 14/169,252, filed on Jan. 31, 2014, now Pat. No. 9,601,837.

(51) Int. Cl.
*F16B 37/06* (2006.01)
*H01R 4/02* (2006.01)
(Continued)

(52) U.S. Cl.
CPC .......... *H01R 4/029* (2013.01); *B23K 20/129* (2013.01); *B23K 20/1295* (2013.01);
(Continued)

(58) Field of Classification Search
CPC ...... H01R 4/029; H01R 4/62; H01R 13/6215; B23K 20/129; B23K 20/1295; B23K 20/227; B23K 20/2336
(Continued)

(56) References Cited

U.S. PATENT DOCUMENTS 3,735,910 A    5/1973  Watson et al.
3,745,641 A    7/1973  Paolini
(Continued)

FOREIGN PATENT DOCUMENTS

DE    102004034496 A1    2/2006
JP    11351224    12/1999
(Continued)

*Primary Examiner* — Gary Estremsky
(74) *Attorney, Agent, or Firm* — Jason Rogers; Price Heneveld LLP

(57) ABSTRACT

A friction-welded ground assembly that includes an alloy substrate with a clearance hole; an aluminum alloy weld nut having a bolt bore and an outer wall; and a grounding bolt. The bore is located substantially within the clearance hole and a portion of the outer wall is joined to the substrate at a friction-welded attachment. Further, the bolt is threaded within the bore. In addition, a method for making a ground includes the steps: rotating an aluminum alloy weld nut having an outer wall at a predetermined speed; lowering the outer wall of the rotating nut into contact with an aluminum alloy substrate to generate a frictional force for a friction time; arresting the rotation of the nut; and applying an axial forging force to the outer wall and the substrate for a forging time.

11 Claims, 5 Drawing Sheets

(51) Int. Cl.
   *B23K 20/12*   (2006.01)
   *B23K 20/227*   (2006.01)
   *B23K 20/233*   (2006.01)
   *H01R 4/62*   (2006.01)
   *H01R 13/621*   (2006.01)
   *H01R 13/648*   (2006.01)
   *H01R 4/64*   (2006.01)
   *B23K 101/38*   (2006.01)
   *B23K 103/04*   (2006.01)
   *B23K 103/10*   (2006.01)
   *B23K 103/20*   (2006.01)

(52) U.S. Cl.
   CPC ........ *B23K 20/227* (2013.01); *B23K 20/2336* (2013.01); *H01R 4/62* (2013.01); *H01R 13/6215* (2013.01); *H01R 13/648* (2013.01); *B23K 2201/38* (2013.01); *B23K 2203/04* (2013.01); *B23K 2203/10* (2013.01); *B23K 2203/20* (2013.01); *H01R 4/64* (2013.01); *H01R 2201/26* (2013.01)

(58) Field of Classification Search
   USPC .............................. 411/171; 228/112.1, 114.5
   See application file for complete search history.

(56) References Cited

U.S. PATENT DOCUMENTS

| | | | |
|---|---|---|---|
| 4,036,560 A * | 7/1977 | Clark | B23B 51/0473 144/23 |
| 4,077,737 A * | 3/1978 | Morse | B23B 51/0426 144/23 |
| 4,256,253 A | 3/1981 | Nishiwaki | |
| 4,676,707 A | 6/1987 | Clearlock et al. | |
| 4,873,763 A * | 10/1989 | Volonta | H01R 4/64 29/825 |
| 5,037,317 A * | 8/1991 | Schwenk | H01R 4/62 439/874 |
| 5,735,446 A | 4/1998 | White et al. | |
| 6,019,272 A | 2/2000 | Badgley et al. | |
| 6,067,839 A | 5/2000 | Xie | |
| 6,107,710 A | 8/2000 | Gamboa | |
| 6,454,891 B1 | 9/2002 | Goss | |
| 6,880,743 B1 * | 4/2005 | Coletta | B23K 20/1295 228/112.1 |
| 6,892,924 B2 * | 5/2005 | Stevenson | B21J 15/027 228/112.1 |
| 7,685,690 B2 | 3/2010 | Ghiran | |
| 7,695,227 B2 | 4/2010 | Stevenson et al. | |
| 7,832,970 B2 * | 11/2010 | Wang | B21J 15/027 228/114.5 |
| 8,486,508 B2 * | 7/2013 | Christ | B23K 20/12 228/112.1 |
| 8,651,361 B1 | 2/2014 | Daroff | |
| 2006/0213954 A1 | 9/2006 | Ruther et al. | |
| 2007/0251979 A1 | 11/2007 | Mauer | |
| 2008/0101857 A1 * | 5/2008 | Christ | B21J 5/066 403/272 |
| 2010/0119772 A1 | 5/2010 | Christ et al. | |
| 2011/0170968 A1 * | 7/2011 | Moffatt | B23B 51/0473 408/204 |

FOREIGN PATENT DOCUMENTS

| | | |
|---|---|---|
| JP | 2002153979 | 5/2002 |
| WO | 2008138388 A1 | 11/2008 |

* cited by examiner

SPIN-WELDED ELECTRICAL GROUND ASSEMBLIES

CROSS REFERENCE TO RELATED APPLICATIONS

This application is a divisional application that claims priority to and the benefit under 35 U.S.C. § 121 of U.S. patent application Ser. No. 14/169,252, filed on Jan. 31, 2014, entitled "SPIN-WELDED ELECTRICAL GROUND AND SPIN WELDING METHODS," issued as U.S. Pat. No. 9,601,837 on Mar. 21, 2017, the entire disclosure of which is hereby incorporated by reference in its entirety.

FIELD OF THE INVENTION

The present invention generally relates to friction-welded assemblies, particularly spin-welded, electrical ground assemblies for vehicular applications.

BACKGROUND OF THE INVENTION

Electrical ground assemblies are numerous in technology-oriented products that rely on electrical and/or electronic components, including vehicles. In automotive applications, electrical ground assemblies are often installed in sheet metal at various locations within the vehicle. Often, fairly expensive and sensitive arc welding processes are employed to fabricate these electrical grounds.

More recently, large-scale production vehicles are evolving to incorporate more aluminum alloy components. Aluminum alloys offer corrosion resistance and weight savings compared to the steels employed in earlier generation vehicles, particularly for sheet metal components. The approaches used to prepare electrical grounds for these aluminum-based vehicles cannot be based on those developed in the past for vehicles employing steel and/or other ferrous-based metal components. The different metallurgy associated with the aluminum-based vehicles, for example, requires the development of new joining approaches.

Accordingly, there is a need for low cost joining approaches for aluminum-based components, particularly vehicles employing electrical ground assemblies installed in aluminum alloy sheet metal.

SUMMARY OF THE INVENTION

According to one aspect of the present invention, a friction-welded ground assembly is provided that includes an aluminum alloy substrate with a clearance hole; an aluminum alloy weld nut comprising a bolt bore and an outer wall; and a grounding bolt threaded within the bore. The bore is within the hole and a portion of the outer wall is joined to the substrate at a spin-welded joint formed by solid state diffusion.

According to another aspect of the present invention, a friction-welded ground assembly is provided that includes: an aluminum alloy substrate with a clearance hole; an aluminum alloy weld nut comprising a bolt bore and an outer wall; and a grounding bolt threaded within the bore. The bore is within the hole and a conically-shaped portion of the outer wall is joined to the substrate at a spin-welded joint formed by solid state diffusion.

According to a further aspect of the present invention, a friction-welded ground assembly is provided that includes: an aluminum alloy substrate with a clearance hole; an aluminum alloy weld nut comprising a bolt bore and a straight-edged outer wall; and a grounding bolt threaded within the bore. The bore is within the hole and a flat portion of the outer wall parallel to the substrate is joined to the substrate at a spin-welded joint formed by solid state diffusion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one with ordinary skill in the art to variously employ the present invention.

Figure 1A:
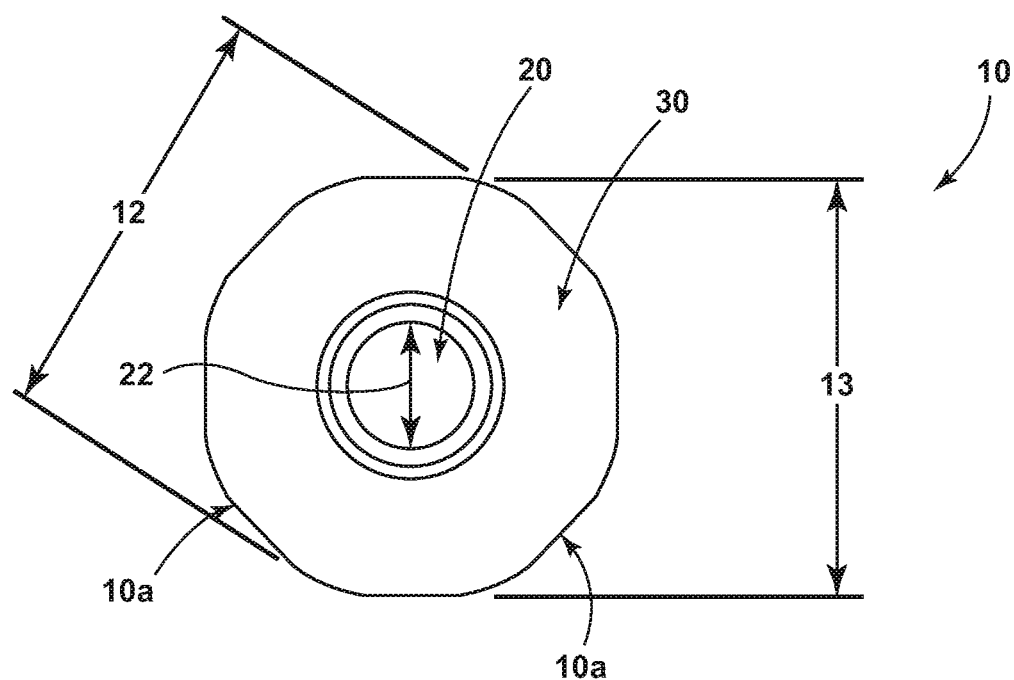
FIG. 1A is a bottom, plan view of a weld nut for a spin-welded electrical ground according to one exemplary embodiment.
Figure 1B:
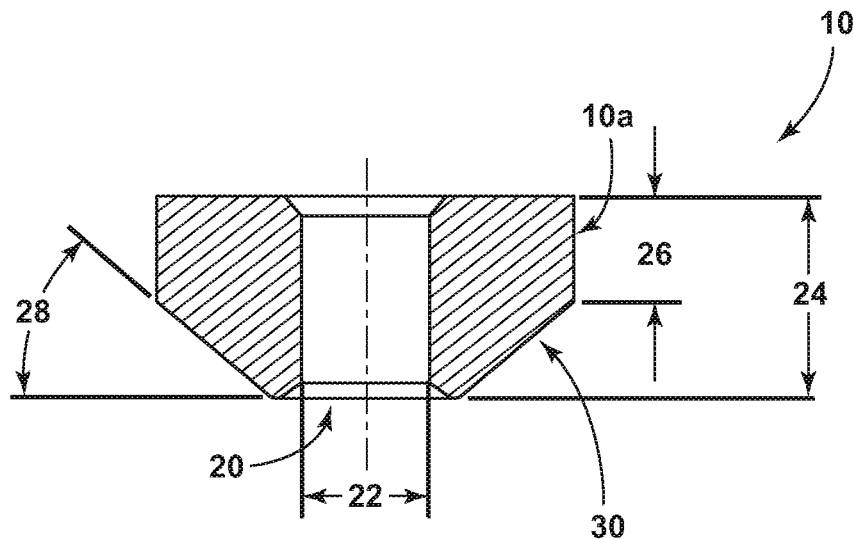
FIG. 1B is a cross-sectional view of the weld nut illustrated in FIG. 1A.
Figure 1C:
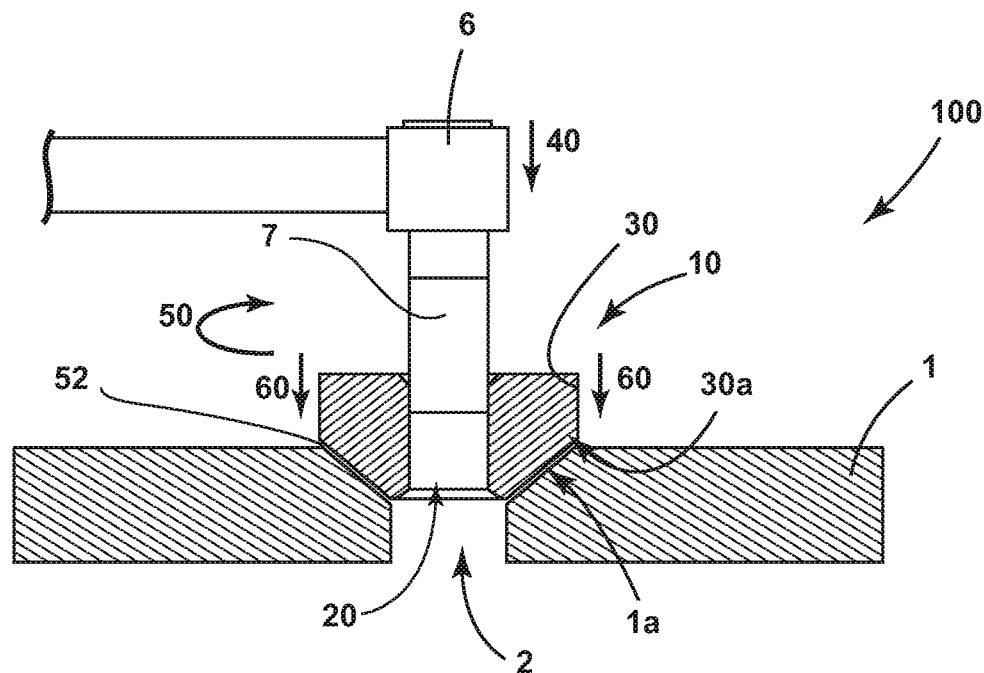
FIG. 1C is a cross-sectional view of the weld nut illustrated in FIG. 1A, a substrate and a driving mechanism during the execution of a method for making an electrical ground according to another exemplary embodiment.

For purposes of description herein, the terms "upper," "lower," "right," "left," "rear," "front," "vertical," "horizontal," and derivatives thereof shall relate to the components illustrated in FIG. 1C. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1A, a weld nut 10 is depicted for use in a spin-welded electrical ground according to an embodiment of this disclosure. The weld nut 10 includes a bolt bore 20 and an outer wall 30. The weld nut 10 is substantially round with an outer diameter 12, and also includes facets 10a for ease of installation such that distance 13 defines the distance between two opposing facets 10a on the outer wall 30. The facets 10a are located on an upper portion of the weld nut 10, above the outer wall 30. In addition, the bolt bore 20 defines an inner diameter 22.

As shown in FIG. 1B, the weld nut 10 is substantially conical in shape insofar as a flat portion of the outer wall 30 is defined by cone angle 28, as depicted in a cross-sectional view of the nut 10. It is this portion of the outer wall 30 of the weld nut 10 that can be rotated against a substrate 1 (see FIGS. 1C and 1D) during a spin-welding process. Accordingly, weld nut 10 is defined by a total height 24 and the portion of the outer wall 30 above the conical section defines an above-substrate height 26.

The weld nut 10 may be composed of various aluminum alloys, with various heat treatments, including but not limited to 606x-T0, 5754, 6061, 6061-H13, 6061-T6, 6111-T4, 6111-PFHT, AA7xxx, AA6xxx, and other compositions and heat treatments suitable for friction welding. Preferably, the composition selected for weld nut 10 should be similar to that employed for the substrate 1. As such, substrate 1 is preferably an aluminum alloy. Further, in some embodiments, substrate 1 can be fabricated from a steel alloy. It is also preferable to select the composition for weld nut 10 with electrical and mechanical properties suitable for electrical ground applications, particularly those employed in a vehicle.

According to one exemplary embodiment, a conical-shaped weld nut 10 may be fabricated from a 606x aluminum alloy with zero temper, an AA6xxx aluminum alloy with a T6 temper or an AA7xxx aluminum alloy with a T6 temper. The weld nut 10 may further have an outer diameter 12 of approximately 18 mm, a distance 13 between opposing facets of approximately 17 to 18 mm, and an inner diameter 22 of about 5 to 6 mm. The weld nut 10 can also have a total height 24 ranging from 8.25 to 8.5 mm with an outer wall 30 defining a cone angle 28 ranging from 39° to 41°. Taken together, the total height 24 and cone angle 28 define the above-substrate height 24, roughly 4.3 mm.

In other embodiments, weld nut 10 can be configured with other dimensions, while retaining a conical-shaped portion of the outer wall 30. The conical shape associated with the outer wall 30 of the weld nut 10 assists in the generation of large frictional forces between the nut 10 and the substrate 1 (see FIGS. 1C and 1D) while the nut 10 is rotated and pressed in an axial direction against the substrate 1.

Referring to FIG. 1C, a friction-welded ground assembly 100 is depicted during installation. The ground assembly 100 includes the weld nut 10 (see also FIGS. 1A and 1B). The assembly 100 includes the substrate 1 having a clearance hole 2. A portion 1a of the substrate 1 is configured to receive the weld nut 10 during the spin-welding procedure. Preferably, portion 1a of the substrate 1 is dimensioned and configured to substantially match a portion 30a of the outer wall 30 of the weld nut 10, as portions 1a and 30a will be in substantial contact during the spin-welding procedure.

Preferably, the substrate 1 is composed of one or more aluminum alloys, consistent with those employed for the weld nut 10.

As shown in FIG. 1C, a driving element 7 of a driving mechanism 6 is inserted into or otherwise attached to the bolt bore 20 of the weld nut 10. The driving mechanism 6 can then be used to rotate the weld nut 10 at a predetermined spindle speed 50. In some embodiments, the driving element 7 possesses a socket-like head that can attach to facets 10a to rotate the weld nut 10. The driving element 7 and mechanism 6 can then apply a lowering movement 40 to the outer wall 30 and bolt bore 20 of the weld nut 10 such that the outer wall portion 30a is placed into substantial contact with the receiving portion 1a of the substrate 1 and at least a portion of the bolt bore 20 is within the clearance hole 2. As weld nut 10 remains rotating at the spindle speed 50 while the outer wall 30 is lowered according to the lowering movement 40, a frictional force 52 is created between the portions 30a and 1a of the nut 10 and the substrate 1, respectively, for a predetermined time—i.e., the "friction time." The frictional force 52 created from this step during the friction time causes a redistribution of material from the portions 1a and 30a in the solid state, one aspect in the development of the friction weld associated with the ground assembly 100. The frictional force 52 is sufficiently high in magnitude to cause such a redistribution of material in the solid state (e.g., by solid state diffusion from the elevated temperatures associated with the friction), but not so high as to generate temperatures sufficient to cause melting.

Next, the spindle speed 50 can be reduced, thus slowing (or arresting) the motion of weld nut 10. At this point, an axial forging force 60 is applied by the driving element 7 and the mechanism 6 to the weld nut 10, forcing the weld nut 10 down against the substrate 1 for a predetermined time—i.e., the "forging time." This forging action associated with the forging force 60 during the forging time provides further redistribution of material in the solid state from the portions 1a and 30a, another aspect in the development of the friction weld associated with the ground assembly 100.

Figure 1D:
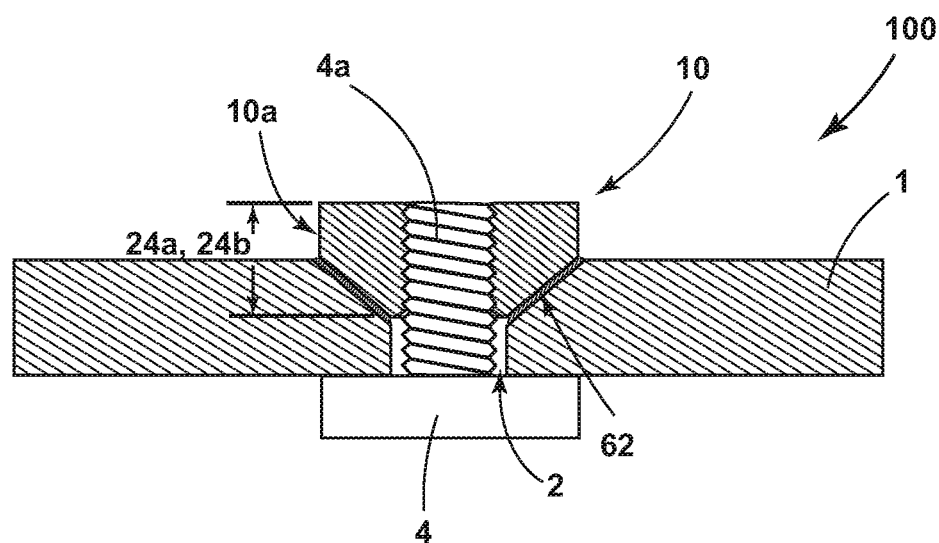
FIG. 1D is a cross-sectional view of a spin-welded electrical ground assembly that includes the weld nut illustrated in FIG. 1A, a substrate and a bolt according to a further exemplary embodiment.

As shown in FIG. 1D, a friction weld attachment 62 has now been developed in the ground assembly 100 that spans the weld nut 10 and the substrate 1. Further, the attachment 62 is located in a region substantially corresponding to the portions 1a and 30a. Because of the material distribution associated with the frictional and forging forces 52 and 60, the overall height 24 of the weld nut 10 is now smaller. In particular, the material redistribution associated with the frictional force 52 defines a friction-adjusted height 24a for the weld nut 10. Similarly, the material redistribution associated with the frictional and forging forces 52 and 60 defines a friction weld-adjusted height 24b of the weld nut 10.

Still referring to FIG. 1D, a bolt 4 fabricated from a steel or aluminum alloy (e.g., a coated steel alloy electrical grounding bolt) can also be threaded into the bolt bore 20 of the weld nut 10. The bolt 4 contains threads 4a that are tapped into the bolt bore 20. The bolt 4 can then be tightened against an electrical connection (not shown), the weld nut 10 and the substrate 1, thus forming the electrical ground assembly 100.

Other exemplary embodiments of the ground assembly 100 can be fabricated with different sequences of the steps described previously in connection with FIG. 1C. For example, the driving element 7 and mechanism 6 can be used to lower the weld nut 10 with a lowering movement 40 before rotation has been imparted to the nut 10. As such, the lowering movement 40 can be employed to move the outer wall 30 such that the outer wall portion 30a is placed into substantial contact with the receiving portion 1a of the substrate 1. At this point, the driving element 7 and mechanism 6 can be employed to rotate the weld nut 10 at a predetermined spindle speed 50 for a friction time, thus generating frictional force 52 between the portions 1a and 10.

In some embodiments of the ground assembly 100 (and associated methods of fabrication), the friction and forging times are predetermined to generate a friction weld attachment 62 in the form of a spin-welded, metallurgical joint. In particular, the attachment 62 in the form of a spin-welded joint is formed between the outer wall 30 of the weld nut 10 and the substrate 1. Further, the attachment 62 possesses mechanical properties suitable for use in a vehicular, electrical ground component (e.g., the attachment 62 is capable of withstanding a push-out load of at least 200 lbs). In other exemplary embodiments, the friction time associated with the application of frictional force 52 can be controlled or otherwise defined by a desired size reduction of the weld nut 10 exemplified by the friction-adjusted height 24a. In another set of exemplary embodiments, the forging time associated with the application of the axial forging force 60 can be controlled or otherwise defined by a desired size reduction of the weld nut 10 exemplified by the weld-adjusted height 24b. For many exemplary embodiments of fabricating the ground assembly 100, a friction time of approximately 0.1 s and a forging time of approximately 1.5 s are employed. Longer friction and/or forging times can be employed to enlarge the attachment 62 (in some cases, adding further strength to it), but doing so will often come at the expense of further size reductions of the weld nut 10 manifested in smaller heights 24a and 24b.

In some embodiments of the methods used to fabricate the friction-welded ground assembly 100, the predetermined spindle speed 50 is set at about 13000 rpm, 15000 rpm, or 18000 rpm. In some cases, the spindle speed 50 may be set between about 13000 rpm and about 18000 rpm. Preferably, the spindle speed 50 is set at a speed approaching 18000 rpm for most configurations and aluminum alloy compositions of weld nut 10 and substrate 1. Further, the frictional force 52 can be set between about 3 and 4 bars for most applications of ground assembly 100. Preferably, the frictional force 52 is set closer to 4 bars. In many embodiments, the forging force 60 is set between approximately 3 and 6 bars. Preferably, the forging force 60 is set at a magnitude that approaches 6 bars to ensure development of the attachment 62 with sufficient mechanical properties.

Figure 2A:
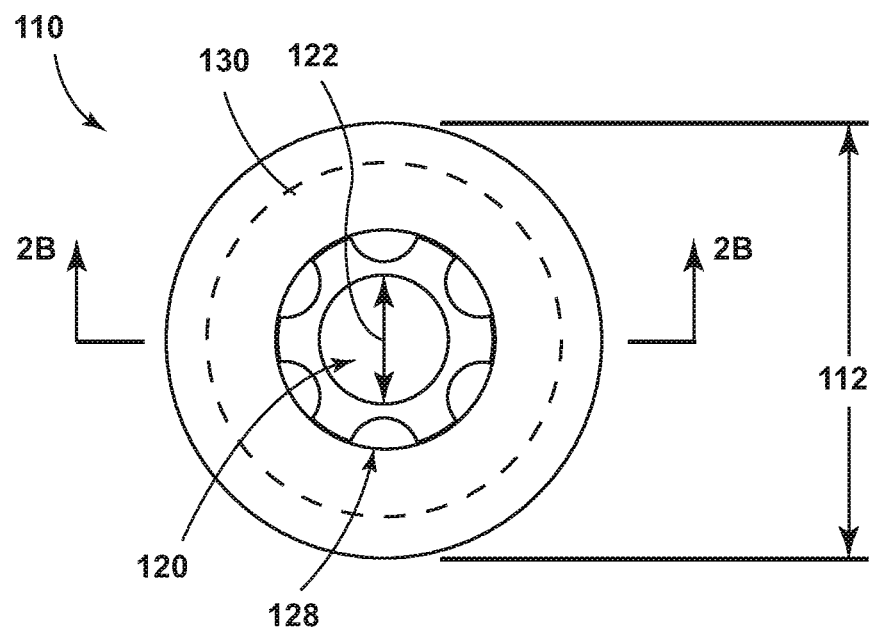
FIG. 2A is a bottom, plan view of a weld nut for a spin-welded electrical ground, adapted for spin-welding by a star-shaped driving mechanism according to another exemplary embodiment.

Referring to FIG. 2A, a weld nut 110 is depicted for use in a spin-welded electrical ground assembly 200 (see FIG. 2C) according to an embodiment of this disclosure. In general, weld nut 110 can be fabricated from the same aluminum alloy materials outlined in connection with the weld nut 10. Here, the weld nut 110 is adapted for spin-welding by a star-shaped driving element 107 (e.g., a Torx® driving head) mounted to a driving mechanism 106 (see FIGS. 2C and 2D).

Figure 2B:
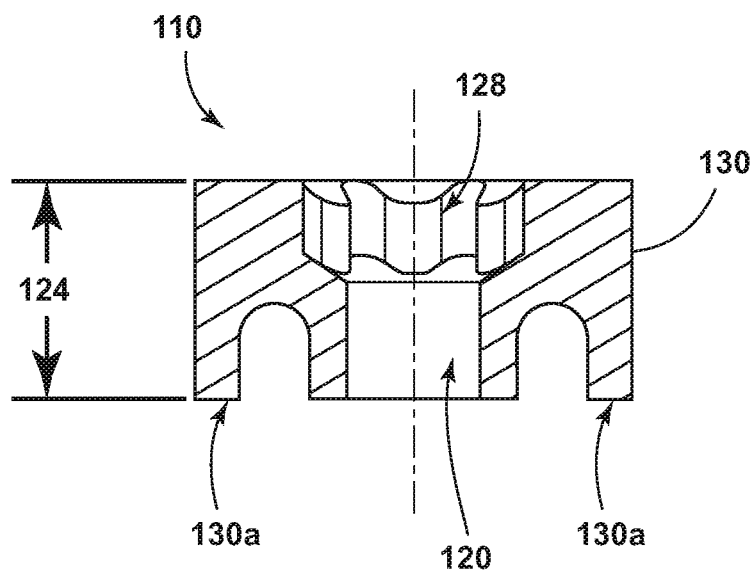
FIG. 2B is a cross-sectional view of the weld nut illustrated in FIG. 2A.

The weld nut 110 is generally similar to the nut 10 depicted in FIGS. 1A and 1B in terms of dimensions and physical configuration. Here, the nut 110 includes a bolt bore 120 and an outer wall 130. The weld nut 110 is substantially round with an outer diameter 112. In addition, the bolt bore 120 defines an inner diameter 122. As shown in FIGS. 2A and 2B, the weld nut 110 is adapted with a star-shaped end 128, configured for spin-welding by the star-shaped driving element 107. It should also be understood that weld nut 110 can be configured with a hex-shaped end 128 (not shown), configured for spin-welding by a hex-shaped driving element 107. Other configurations of the weld nut 110 are feasible that can be adapted for driving elements 107 of varying shapes and configurations.

Figure 2C:
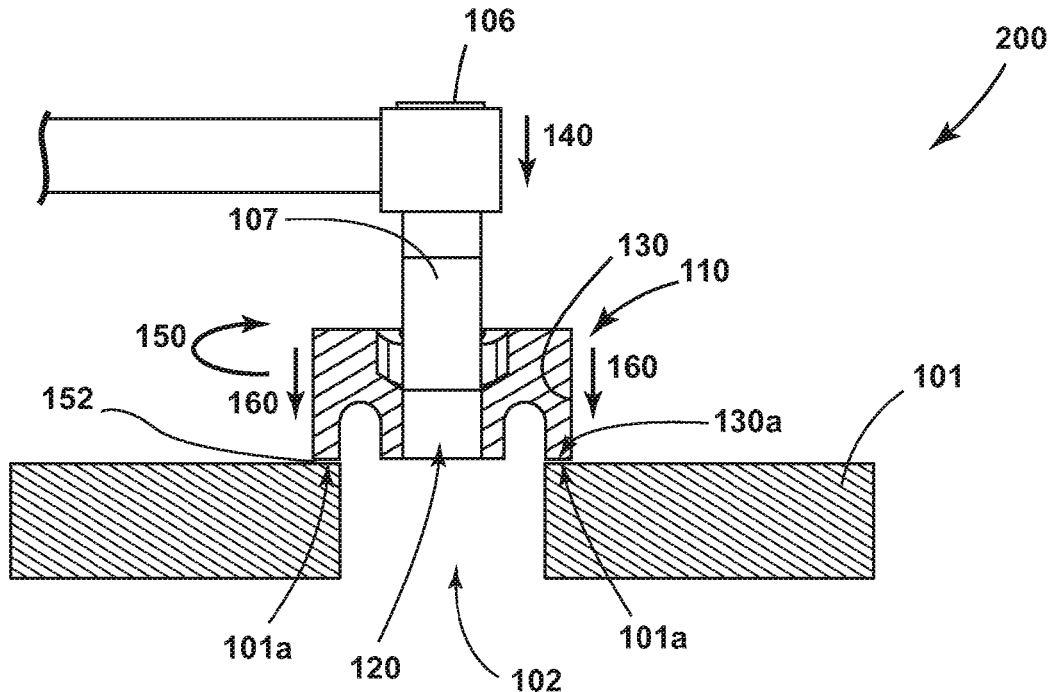
FIG. 2C is a cross-sectional view of the weld nut illustrated in FIG. 2A, a substrate and a star-shaped driving mechanism during the execution of a method for making an electrical ground according to an additional exemplary embodiment.
Figure 2D:
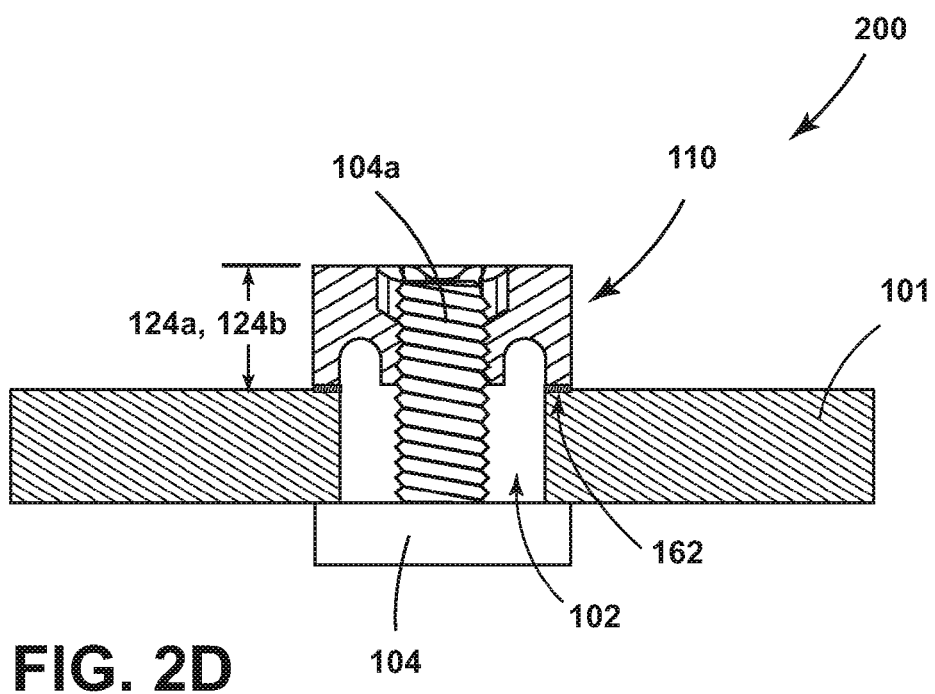
FIG. 2D is a cross-sectional view of a spin-welded electrical ground assembly that includes the weld nut illustrated in FIG. 2A, a substrate and a bolt according to a further exemplary embodiment.

Further, the weld nut 110 possesses a generally straight-edged outer wall 130, with a flat portion 130a configured for friction welding against a portion 101a of a substrate 101 (see FIGS. 2C and 2D). It is this portion 130a of the outer wall 130 of the weld nut 110 that can be rotated against the substrate 101 during a spin-welding process. Accordingly, weld nut 110 is defined by a total height 124. In addition, substrate 101 is preferably an aluminum alloy, with possible compositions comparable to those described earlier in connection with substrate 1. Further, in some embodiments, substrate 101 can be fabricated from a steel alloy.

According to one exemplary embodiment, the weld nut 110 may be fabricated from a 6061-H13 aluminum alloy with a T6 temper. The weld nut 110 may further have an outer diameter 112 of approximately 18 mm, and an inner diameter 122 of about 5 to 6 mm. The weld nut 110 can also have a total height 124 of approximately 9 mm with an outer wall portion 130a of about 1.5 to 1.6 mm in width.

In other embodiments, weld nut 110 can be configured with other dimensions, while retaining a portion 130a of the outer wall 130 that is substantially flat. The substantially flat portion 130a associated with the outer wall 130 of the weld nut 110 assists in the generation of large frictional forces between the nut 110 and the substrate 101 (see FIGS. 2C and 2D) while the nut 110 is rotated and pressed in an axial direction against the substrate 101.

As shown in FIGS. 2C and 2D, the methods employed to fabricate the ground assembly 200 employing the weld nut 110 are generally similar to those described earlier in connection with weld nut 10 and ground assembly 100. For example, a friction-welded ground assembly 200 is depicted during installation in FIG. 2C. The ground assembly 200 includes a weld nut 110 (see also FIGS. 2A and 2B). The assembly 200 includes an aluminum alloy substrate 101 and, in some embodiments, further includes a clearance hole 102. A portion 101a of the substrate 101 is configured to receive the weld nut 110 during the spin-welding procedure. Preferably, portion 101a of the substrate 101 is dimensioned and configured to substantially match the portion 130a of the outer wall 130 of the weld nut 110, as portions 101a and 130a will be in substantial contact during the spin-welding procedure. Preferably, the substrate 101 is composed of one or more aluminum alloys, consistent with those employed for the weld nut 110.

As also shown in FIG. 2C, the driving element 107 of the driving mechanism 106 is affixed or otherwise attached to the bolt bore 120 of the weld nut 110. In particular, the driving element 107 can be configured with a star-shaped, hex-shaped, or other end adapted fit within the end 128 of the weld nut 110. The driving mechanism 106 can then be used to rotate the weld nut 110 at a predetermined spindle speed 150. The driving element 107 and mechanism 106 can then apply a lowering movement 140 to the outer wall 130 and bolt bore 120 of the weld nut 110 such that the outer wall portion 130a is placed into substantial contact with the receiving portion 101a of the substrate 101.

As weld nut 110 remains rotating at the spindle speed 150 while the outer wall 130 is lowered according to the lowering movement 140, a frictional force 152 is created between the portions 130a and 101a of the nut 110 and the substrate 101, respectively, for a predetermined friction time. The frictional force 152 created from this step during the friction time causes a redistribution of material from the portions 101a and 130a in the solid state, one aspect in the development of the friction weld associated with the ground assembly 200. The frictional force 152 is sufficiently high in magnitude to cause such a redistribution of material in the solid state, but not so high as to generate temperatures sufficient to cause melting.

Next, the spindle speed 150 can be reduced, thus slowing (or arresting) the motion of weld nut 110. At this point, an axial forging force 160 is applied by the driving element 107 and the mechanism 106 to the weld nut 110, thus forcing the weld nut 110 down against the substrate 101 for a predetermined forging time. This forging action associated with the forging force 160 during the forging time provides further redistribution of material in the solid state from the portions 101a and 130a, another aspect in the development of the friction weld associated with the ground assembly 200.

As shown in FIG. 2D, a friction weld attachment 162 has now been developed in the ground assembly 200 that spans the weld nut 110 and the substrate 101. Further, the attachment 162 is located in a region substantially corresponding to the portions 101a and 130a. Because of the material distribution associated with the frictional and forging forces 152 and 160, the overall height 124 of the weld nut 110 is now smaller. In particular, the material redistribution associated with the frictional force 152 defines a friction-adjusted height 124a for the weld nut 110. Similarly, the material redistribution associated with the frictional and forging forces 152 and 160 defines a friction weld-adjusted height 124b of the weld nut 110. As this material redistribution occurs, the weld nut 110 is lowered somewhat relative to the substrate. As such, it is preferable to include the clearance hole 102 in the substrate 101 to accommodate such movement during the friction-welding process.

Still referring to FIG. 2D, a bolt 104 (e.g., an aluminum alloy electrical grounding bolt) can also be threaded into the bolt bore 120 of the weld nut 110. The bolt 104 contains threads 104a that are tapped into the bolt bore 120. The bolt 104 can then be tightened against an electrical connection (not shown), the weld nut 110 and the substrate 101, thus forming the electrical ground assembly 200.

It should also be understood that the exemplary, described methods for creating the ground assembly 200 can be modified consistent with the modifications of the methods described earlier in connection with the ground assembly 100. Similarly, the parameters, such as spindle speed 50, described in connection with the methods for fabricating ground assembly 100 can likewise be applied in the methods for fabricating ground assembly 200.

Figure 3:
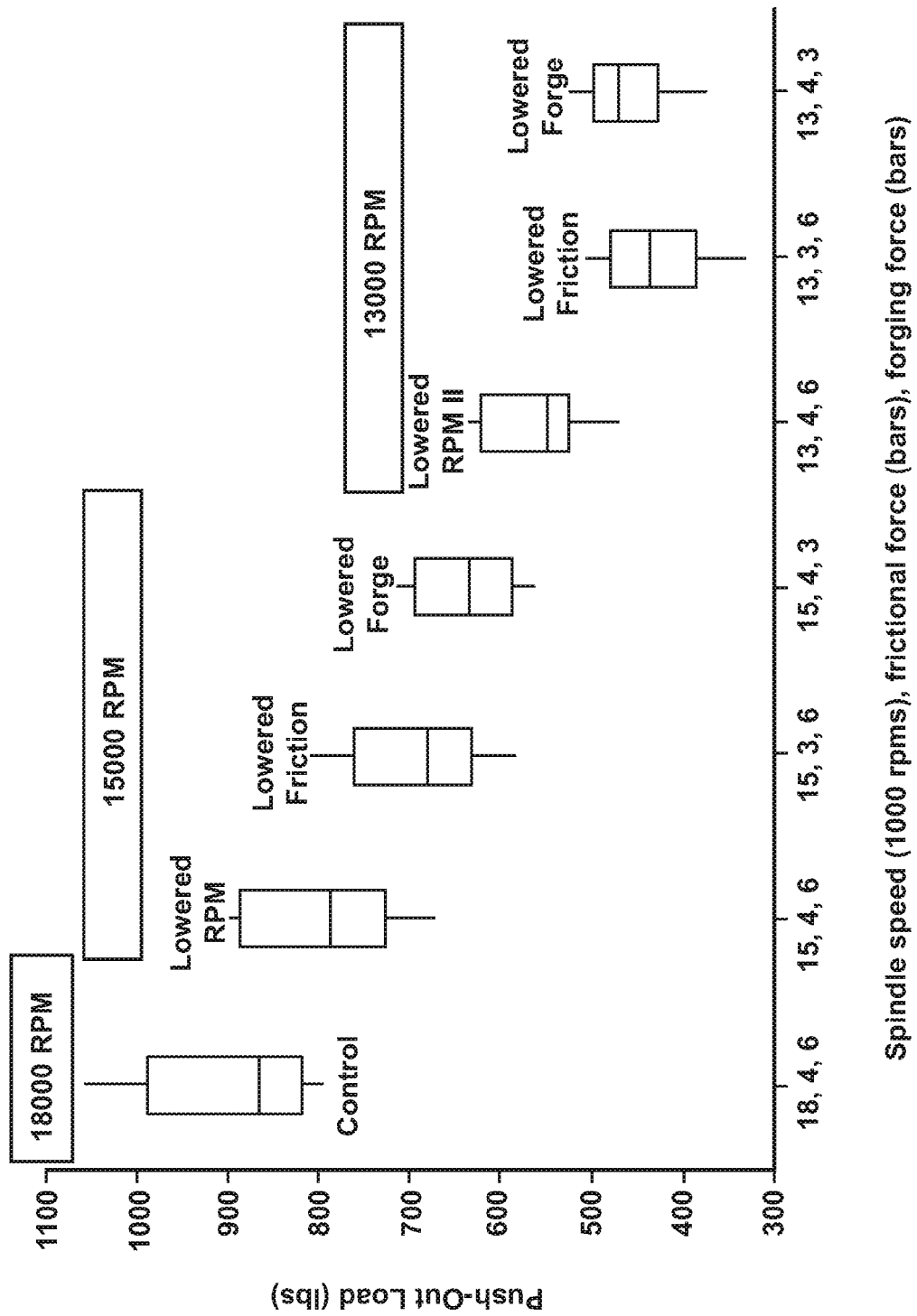
FIG. 3 is a chart depicting push-out loads sustained by friction-welded ground assemblies fabricated with varying spindle speeds according to another exemplary embodiment.

Referring to FIG. 3, a box chart depicts the results of an experiment conducted to investigate the effect of spindle speed (e.g., speed 50) on the push-out resistance of spin-welded ground assemblies, indicative of ground assemblies 100 and 200. The tested ground assemblies were spin-welded with weld nuts and substrates fabricated from a 5754-O aluminum alloy with configurations comparable to ground assembly 200. The thickness of the substrate sheet was approximately 1.3 mm and the sheet possessed a clearance hole of 11.5 mm or 12.5 mm. Further, each of the boxes plotted in FIG. 3 shows the median and range of push-out loads (lbs) for spin-welded ground assemblies for a control group and six experimental groups, all groups demonstrating push-out loads of at least 200 lbs. The control group is the "18, 4, 6" group, reflecting a spindle speed of 18000 rpm, frictional force of 4 bars and a forging force of 6 bars. The other groups depicted in FIG. 3 reflect lower spindle speeds, frictional force, and/or forging force levels. For example, the "15, 4, 3" group corresponds to a spindle speed of 15000 rpm, frictional force of 4 bars and a forging force of 3 bars.

As the chart depicted in FIG. 3 demonstrates, the effect of lowering frictional and/or forging forces for a given spindle speed are relatively minimal and likely not statistically significant. In comparison, there is a pronounced reduction in push-out resistance that is statistically significant when employing a spindle speed of 13000 rpm in comparison to a spindle speed of 18000 rpm. As such, it is generally preferable to employ spindle speeds approaching 18000 rpm when creating ground assemblies 100 and 200.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A friction-welded ground assembly, comprising:
an aluminum alloy substrate with a clearance hole;
an aluminum alloy weld nut comprising a bolt bore and an outer wall; and
a grounding bolt threaded within the bore,
wherein the bore is within the hole and a portion of the outer wall is joined to the substrate at a spin-welded joint formed by solid state diffusion that comprises a push-out load of at least 500 lbs, the joint formed by rotation of the weld nut in contact with the clearance hole at: (a) a rotational speed between about 15000 rpm to about 18000 rpm, (b) a frictional force between about 3 bars and 4 bars and (c) an axial forging force between about 3 bars and 6 bars.

2. The ground assembly according to claim 1, wherein the bolt bore of the weld nut is adapted for spin-welding by a hex-shaped driving element.

3. The ground assembly according to claim 1, wherein the bolt bore of the weld nut is adapted for spin-welding by a star-shaped driving element.

4. The ground assembly according to claim 1, wherein the substrate is a vehicular component.

5. The ground assembly according to claim 1, wherein the spin-welded joint is formed by solid state diffusion at an elevated temperature without melting between the outer wall and the substrate.

6. A friction-welded ground assembly, comprising:
an aluminum alloy substrate with a clearance hole;
an aluminum alloy weld nut comprising a bolt bore and an outer wall; and
a grounding bolt threaded within the bore,
wherein the bore is within the hole and a conically-shaped portion of the outer wall is joined to the substrate at a spin-welded joint formed by solid state diffusion that comprises a push-out load of at least 500 lbs, the joint formed by rotation of the weld nut in contact with the clearance hole at: (a) a rotational speed between about 15000 rpm to about 18000 rpm, (b) a frictional force between about 3 bars and 4 bars and (c) an axial forging force between about 3 bars and 6 bars.

7. The ground assembly according to claim 6, wherein the substrate is a vehicular component.

8. The ground assembly according to claim 6, wherein the spin-welded joint is formed by solid state diffusion at an elevated temperature without melting between the outer wall and the substrate.

9. A friction-welded ground assembly, comprising:
an aluminum alloy substrate with a clearance hole;
an aluminum alloy weld nut comprising a bolt bore and a straight-edged outer wall;
a grounding bolt threaded within the bore,
wherein the bore is within the hole and a flat portion of the outer wall parallel to the substrate is joined to the substrate at a spin-welded joint formed by solid state diffusion that comprises a push-out load of at least 500 lbs, the joint formed by rotation of the weld nut in contact with the clearance hole at: (a) a rotational speed between about 15000 rpm to about 18000 rpm, (b) a frictional force between about 3 bars and 4 bars and (c) an axial forging force between about 3 bars and 6 bars.

10. The ground assembly according to claim 9, wherein the substrate is a vehicular component.

11. The ground assembly according to claim 9, wherein the spin-welded joint is formed by solid state diffusion at an elevated temperature without melting between the outer wall and the substrate.

* * * * *